(12) United States Patent
Kurella et al.

(10) Patent No.: US 10,152,041 B2
(45) Date of Patent: Dec. 11, 2018

(54) METHOD AND APPARATUS FOR ENABLING MODEL DRIVEN NAVIGATION

(71) Applicant: General Electric Company, Schenectady, NY (US)

(72) Inventors: Nagesh Laxminarayana Kurella, Hyderabad (IN); Abhik Banerjee, Hyderabad (IN); Ayush Srivastava, Hyderabad (IN); Siva Gundeboina, Hyderabad (IN); Subhash Boorla, Hyderabad (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 211 days.

(21) Appl. No.: 14/983,720

(22) Filed: Dec. 30, 2015

(65) Prior Publication Data
US 2017/0192407 A1    Jul. 6, 2017

(51) Int. Cl.
| G06F 3/048 | (2013.01) |
| G05B 19/05 | (2006.01) |
| G06F 3/0482 | (2013.01) |
| G05B 23/02 | (2006.01) |
| G06Q 10/06 | (2012.01) |
| G06F 3/0488 | (2013.01) |

(52) U.S. Cl.
CPC ........... G05B 19/05 (2013.01); G06F 3/0482 (2013.01); *G05B 23/0216* (2013.01); *G05B 2219/13144* (2013.01); *G06F 3/04886* (2013.01); *G06Q 10/06* (2013.01)

(58) Field of Classification Search
CPC .................. G06F 9/4443; G06F 3/048; G05B 2219/13144; G05B 2219/32128; G05B 23/0216

USPC .............................................. 700/29, 83, 86
See application file for complete search history.

(56) References Cited

U.S. PATENT DOCUMENTS

| 7,627,563 | B2 | 12/2009 | Wories | |
| 7,650,196 | B2* | 1/2010 | Gordon | G05B 19/409 700/83 |
| 7,715,929 | B2* | 5/2010 | Skourup | G05B 17/02 340/3.1 |
| 7,823,087 | B2 | 10/2010 | Nan | |
| 8,078,962 | B2 | 12/2011 | Aoki | |
| 8,495,097 | B1 | 7/2013 | Ayers | |
| 2002/0046290 | A1 | 4/2002 | Andersson et al. | |

(Continued)

FOREIGN PATENT DOCUMENTS

WO      0165322 A1    9/2001

OTHER PUBLICATIONS

PCT Search Report and Written Opinion issued in connection with corresponding PCT Application No. PCT/US2016/067930 dated Mar. 29, 2017.

*Primary Examiner* — Michael J Brown
(74) *Attorney, Agent, or Firm* — GE Global Patent Operation; Scott R. Stanley

(57) ABSTRACT

Systems and methods for enabling generation of navigation schema for a Human Machine Interface (HMI) application based on control system models are disclosed. Information regarding processes and assets of a control system is received. A model of the control system is generated from the received information. The model is accessed by the HMI application during runtime to enable generation of navigation schema for the HMI application based on the model.

25 Claims, 12 Drawing Sheets

(56) References Cited

U.S. PATENT DOCUMENTS

| | | |
|---|---|---|
| 2004/0024662 A1 | 2/2004 | Gray et al. |
| 2007/0035398 A1 | 2/2007 | Vesel |
| 2008/0077617 A1 | 3/2008 | Schulz et al. |
| 2009/0037302 A1 | 2/2009 | Schulz |
| 2009/0106732 A1 | 4/2009 | Hanson |
| 2010/0083110 A1 | 4/2010 | Scott et al. |
| 2017/0108835 A1* | 4/2017 | Srivastava ............. G05B 13/04 |

* cited by examiner

US 10,152,041 B2

METHOD AND APPARATUS FOR ENABLING MODEL DRIVEN NAVIGATION

TECHNICAL FIELD

The present disclosure relates to apparatus and methods for using models to enable navigation through HMI (Human Machine Interface).

BACKGROUND

Modern industrial control systems have enabled factories and plants with machinery to become partly or wholly automated. The various processes, assets, parameters, alarms of a plant can be monitored and controlled via the use programmable logic controllers (PLCs) that are coupled to the machinery. PLCs can be monitored and controlled via higher level systems which can comprise graphical interfaces such as, HMI (Human Machine Interface). HMI enable users to navigate a control system at different levels. A top level HMI can show the user a view spanning an entire establishment monitored by the control system. Detailed views are also enabled by the HMI that allow the user to drill down to investigate various parts of the control system.

SUMMARY

In the legacy control system world, the development of the control logic for the process flows in a plant and the development of the HMI screens to monitor and manipulate the process flows occur independently. Upon separately developing the control logic and the HMI, a navigation object is attached. Thereafter, the navigation object is configured to display the appropriate content based on, for example, user input. Embodiments are disclosed herein for automatically generating navigational schema for a HMI application based on a model of the control system.

A method for automatically generating the navigation schema for a HMI application is disclosed in some embodiments. The method comprises receiving, by at least one computing device, information regarding one or more processes and one or more assets of a control system and generating, by the computing device, a model of the control system from the received information. In some embodiments, the model can be one of a process-centric model or an asset-centric model. The method further comprises providing, by the computing device, access to the model during the runtime of a Human Machine Interface application. Generation of navigation schema for the Human Machine Interface application based on the model is thus enabled by the computing device. A navigation schema based on processes of the control system is generated for the process-centric model whereas a navigation schema based on assets of the control system is generated for the asset-centric model.

A computing device comprising a processor and a storage medium for tangibly storing thereon program logic executable by the processor is disclosed in some embodiments. In some embodiments, the program logic comprises receiving logic that receives information regarding one or more processes and one or more assets of a control system and generating logic that generates a model of the control system from the received information. In some embodiments, the model can be one of a process-centric model or an asset-centric model. The apparatus comprises storing logic that provides access to the model during runtime of a Human Machine Interface application and logic for enabling generation of navigation schema for the Human Machine Interface application based on the model.

A non-transitory computer-readable storage medium, comprising instructions for enabling generation of the navigation schema for HMI applications is disclosed in some embodiments. The instructions comprise instructions for receiving information regarding one or more processes and one or more assets of a control system, generating a model of the control system from the received information, the model can be one of a process-centric model or an asset-centric model. The medium further comprises instructions for providing access to the model during the runtime of a Human Machine Interface application and enabling generation of navigation schema for the Human Machine Interface application based on the model. In some embodiments, a navigation schema based on processes of the control system is generated for the process-centric model. In some embodiments, a navigation schema based on assets of the control system is generated for the asset-centric model user.

These and other embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
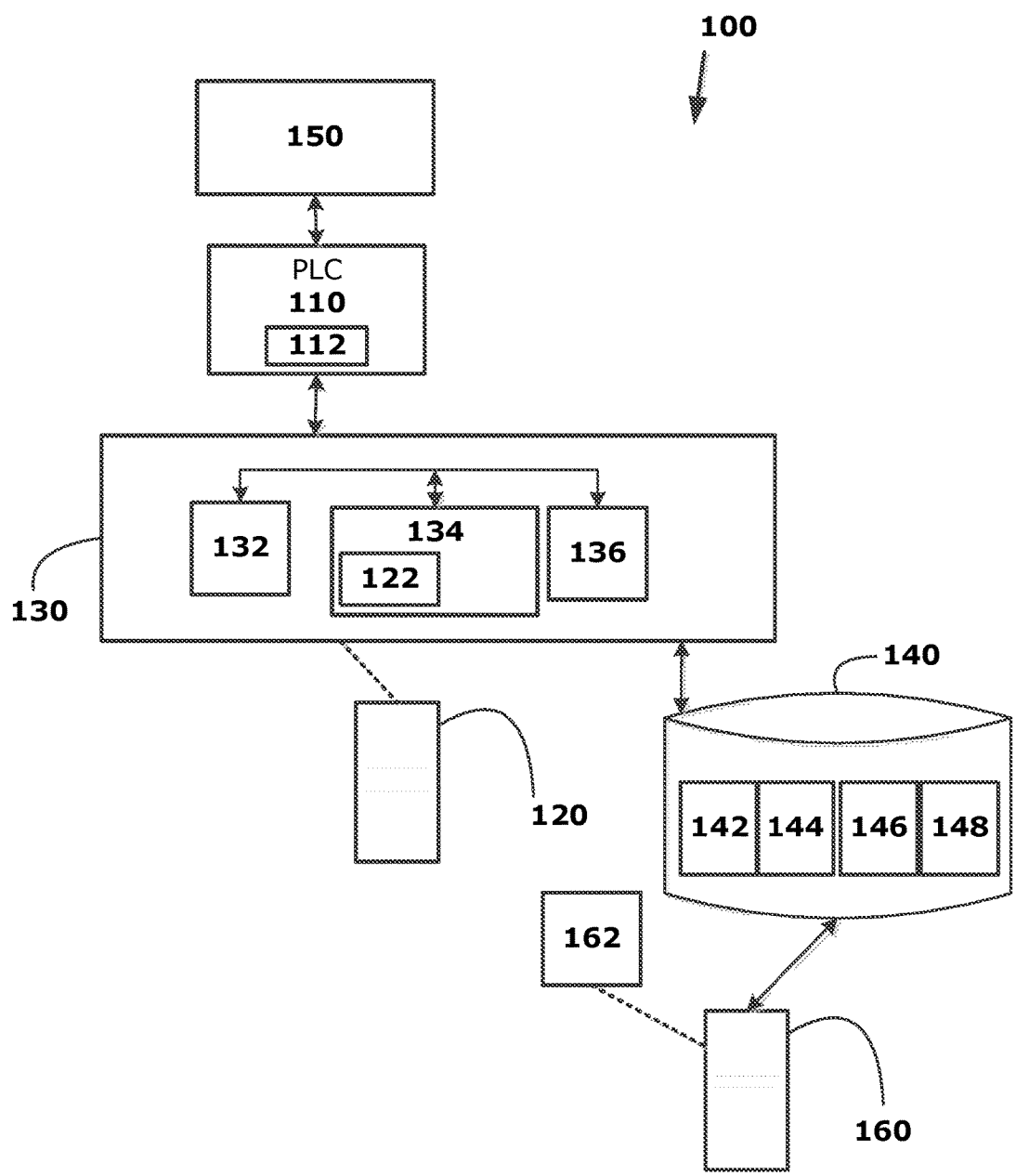
FIG. 1 is a schematic diagram of an apparatus that generates models of an industrial unit to enable navigation of HMI screens in accordance with some embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments are described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be stored in a computer readable storage medium and provided to a processor of a general purpose computer, special purpose computer, ASIC, or other programmable data processing apparatus, such that the instructions or logic, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Automation of industrial units is an evolving field wherein new developments emerge on a regular basis with the constant innovation that is occurring in the hardware and software systems that run the units. Various hardware elements such as PLCs (Programmable Logical Controllers) are used in the automation industry. The sections of a unit controlled by the PLCs can be monitored by human users via HMIs that provide data from the PLCs along with other analytics. An industrial plant is a collection of assets or machines and hardware components that interact and/or bear a relationship with each other to generate an output. Computerized models are developed that relate the plant processes and its corresponding assets to each other. They model the various interactions between the assets of a plant during the processes. A model of a plant can be a base container that comprises the process information along with its associated assets and parameters. The model can also determine the relationships that exist between one or more of the processes and assets.

As mentioned earlier, in the legacy control system world, the development of the control logic for the process flows in a plant and the development of the HMI screens to monitor and manipulate the process flows occur independently. One problem with such an approach is that the I/O (input/output) variables attached to the assets and/or processes are not passed to the HMI system. Hence, during the development of the HMI screens, the I/O variables need to be attached to the HMI components representing the respective devices and processes. Moreover, any changes such as addition or removal of machinery or changes to process flows in a plant need to be separately incorporated into the control logic of the plant and into its HMI.

Embodiments are disclosed herein that provide for transferring the configuration information from the model configuration stage to the HMI screen development stage thereby providing a simplified, automated way to configure the navigation of the HMI screens at runtime. FIG. 1 is a schematic diagram of an apparatus that generates models of industrial units to enable navigation of HMI screens in accordance with some embodiments. A real-world system, for example, a water treatment plant 150 is monitored and controlled by the PLC 110. The PLC 110 collects and provides the data from the various machinery and hardware components of the plant 150 to human users or operators for monitoring and control. The collected data can be provided via the various screens of a HMI application 162 which can be executed by a computing device 160 that can be proximate to or located remotely from the plant 150.

Additionally, another computing device 120 can be communicatively coupled to the PLC 110 to receive and analyze data related to the plant control system 150. In some embodiments, a model configuration module 130 can be executed by the computing device 120 which generates one or more models of the plant 150 based, for example, on the received plant data. The models comprise information regarding the processes, assets, asset groups, asset parameters and relationships between the assets. The models can be made available to the HMI application 162 in order to enable user navigation through the various assets and processes of the plant 150. This eliminates the need to configure the navigation path manually during the HMI screen development.

In some embodiments, the model configuration module 130 comprises an information receiving module 132 that receives information 122 regarding the plant 150. The information can comprise information regarding the assets, asset groups, processes which can comprise parent processes and their child processes or sub-processes, the assets involved in the processes and interactions between the assets within the processes. By the way of illustration and not limitation, the details regarding the assets of the plant 150 and their interactions can be included in an input file 112 having .xls, .xml or other format. In some embodiments, the input file 112 can be directly accessed from the PLC 110 wherein the PLC stores structured data that comprises data regarding a signal and the signal source. In some embodiments, wherein the PLC 110 stores unstructured data, the input file 112 comprises information regarding the signal but does not comprise information regarding the signal source. In this case, the input can be supplemented by the source information which can be provided by a user, for example, via uploading a supplemental input file to the computing device 120.

The information 122 thus received is utilized by the model generation module 134 for generating one or more of the asset-centric models or process-centric models. A process-centric model 142 can be developed by identifying the processes of the plant. The information 122 regarding the processes that can be represented in the process-centric model can comprise the hierarchies of the processes, assets involved in each process, the state of the assets in each of the processes and the relationships or interactions between the assets during each of the processes. An asset-centric model 144 can also be developed by the model configuration module 130 in some embodiments. The asset-centric model 144 represents asset groups with their respective assets, attributes of the assets and processes that can be performed with each of the assets along with their input/output parameters.

The model configuration module 130 further comprises an output module 136 that is configured to generate an output comprising the information from the models 142, 144. In some embodiments, the output module 136 can generate output files 146, 148 that respectively comprise information represented by the process-centric model 142 and the asset-centric model 144. The output files 146, 148 can be files having JSON (JavaScript Object Notation), csv (comma separated values) or XML (Extensible Markup Language) or other formats, each of which contains various details from their respective models. Although two different files are shown for the models 142 and 144, it can be appreciated that a single file can include both the models 142, 144 in some embodiments.

The output files 146, 148 provide model structures that can be consumed by the HMI application 162 at runtime for navigating through the user interface elements such as but not limited to menus, graphics or other navigational UI buttons such as a 'back' button or a 'forward' button. In some embodiments, the HMI application 162 can be configured to be model-aware by consuming one or more of the files 146, 148 associated with the models 142, 144 and providing navigation based on the models 142, 144. If the HMI 162 is to be configured to allow a user to navigate through the assets, then the asset-centric model 144 is accessed. If the HMI 162 is to be configured to allow a user to navigate through the processes, then a process-centric model 142 is accessed. Although the HMI application 162 is shown as being executed by a second computing device 160 disparate from the first computing device 120, it can be appreciated that the first computing device 120 can also execute the HMI application 162 in addition to the model configuration module 130 to permit navigation in accordance with embodiments described herein.

Figure 2:
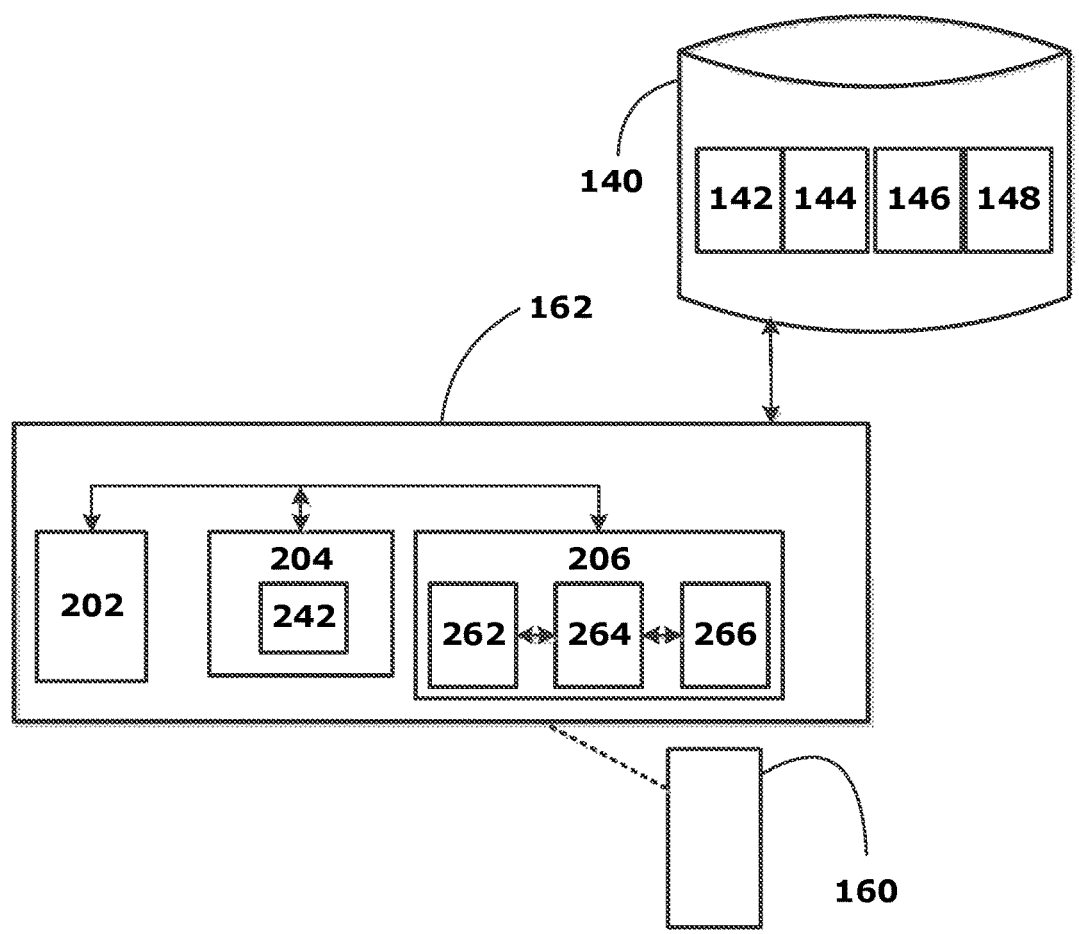
FIG. 2 is a schematic diagram of the HMI application in accordance with some embodiments described herein.

FIG. 2 is a schematic diagram of the HMI application 162 in accordance with some embodiments described herein. The HMI application 162 comprises a parsing module 202, a schema generation module 204 and a navigation module 206. In some embodiments, the navigation module 206 further comprises a user input receiving module 262, an entity identification module 264 and a screen generation module 266.

If the HMI application 162 is to be configured to allow a user to browse through or navigate through the various plant processes, a navigation schema based on the process-centric model needs to be developed. During HMI runtime, the parsing module 202 accesses and parses the output file 144 to obtain information regarding the process-centric model 142. The parsed information is accessed by the schema generation module 204 which generates a navigation schema for the user interface screens of the HMI application 162 that allow a user to browse through and obtain information regarding the various plant entities which comprise without limitation, the processes and assets associated with the plant 150. Accordingly, the schema generation module 204 can identify parent processes which further contain sub-processes, the assets involved in the various processes, the asset states and their inter-relationships during the processes.

The navigation module 206 is configured to receive the user input comprising requests for data regarding entities in the plant 150 and show output to the user responsive to the received input. An input receiving module 262 receives the user input which can comprise a selection gesture such as, but not limited to, a click, a tap, a swipe or other input signifying a user's selection of an entity for further information. For example, the user can click with a mouse or tap on the surface of a touchscreen of a client device to activate a user interface element that corresponds to an entity in the plant 150 or based on the HMI application 162 configuration, even provide an audio command to indicate selection.

Based on the user's selection gesture, the entity identification module 264 identifies one or more entities associated with the user selection. For example, if the user selects to view information regarding a process, the entity identification module 264 can be configured to identify as entities the process, its sub-processes, assets involved in one or more of the process and sub-processes, their states and interactions. The display module 266 can accordingly display the entities identified in response to the user selection on a screen of the HMI application 162. Further user selections of the entities, can allow the user to drill down into the sub-processes or inspect particular assets associated with the processes or sub-processes.

Similarly, the HMI application 162 can be configured to allow a user to navigate through the assets via accessing asset-centric model 144. The output file 148 comprising information regarding the asset-centric model 144 is parsed by the parsing module 202 and the schema generation module 204 generates navigation schema based on asset hierarchies such as for example, asset groups. When a user selection gesture is received by the receiving module 262, the assets corresponding to the user gesture are identified by the entity identification module 264 and their information is shown to be user on a screen by the display module 266.

It can be appreciated that the generation of navigation schema and display of details based on the process-centric model 142 and the asset-centric model 144 are shown separately for ease of illustration but this is not necessary. As will be detailed further herein, screens from the HMI application 162 can be configured to retrieve and present information from both the asset-centric model 144 and the process-centric model 142 based on user selections.

Figure 3:
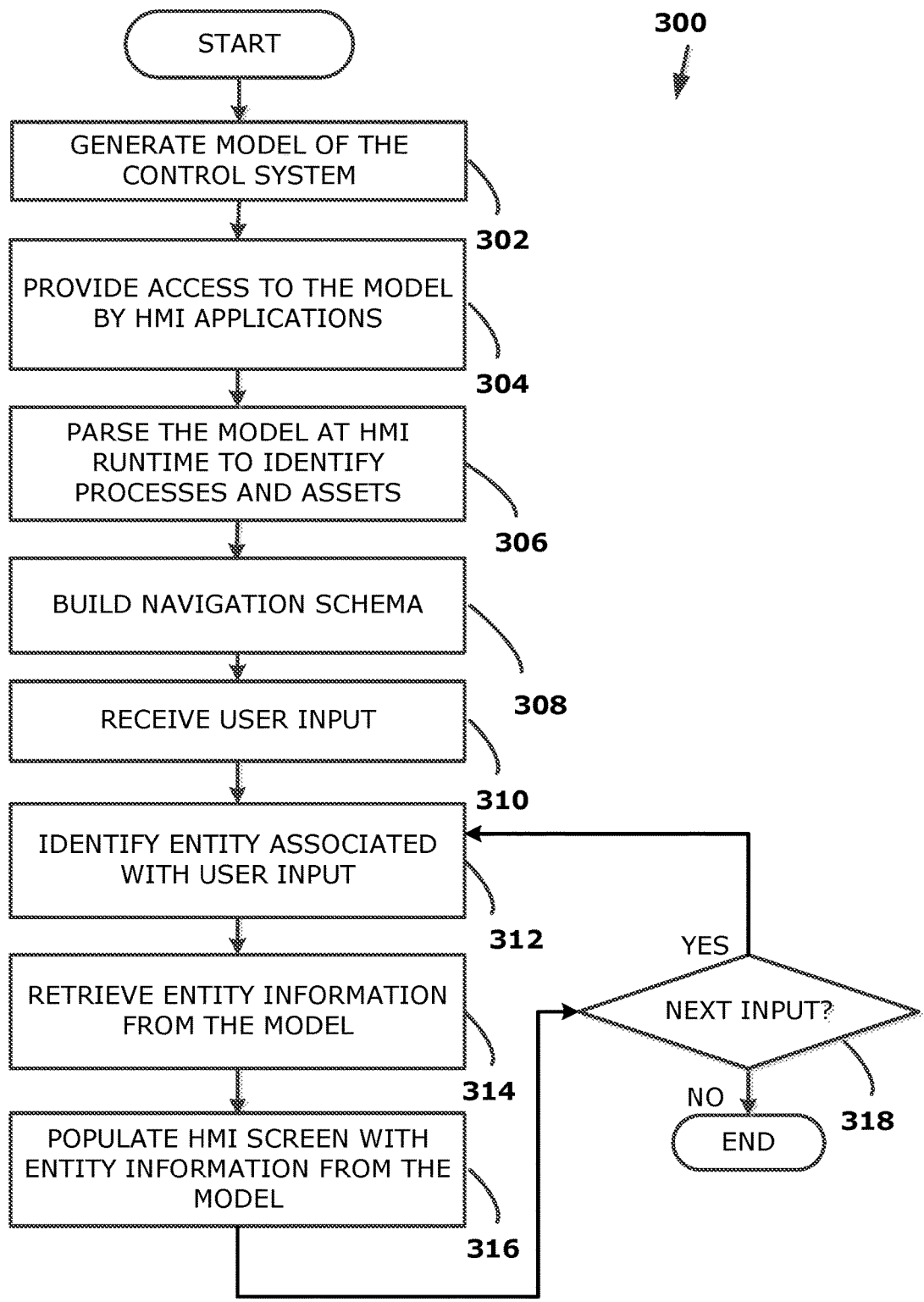
FIG. 3 is a flowchart that details a method of enabling model driven navigation in a control system application in accordance with some embodiments.

FIG. 3 is a flowchart 300 that details a method of enabling model driven navigation in a control system application in accordance with some embodiments. The method begins at 302 wherein a model of the control system 150 is initially generated by the model configuration module 130 in accordance with embodiments described herein. In some embodiments, the model generated can be a process-centric model 142 that represents one or more processes, sub-processes, assets executing the processes and sub-processes, or assets acted upon by the processes or sub-processes and their inter-relationships. In some embodiments, the model generated can be an asset-centric model that represents information of the plant 150 based on one or more of its assets, asset groups, the processes associated with the assets and their interactions.

Output from the model configuration module 130 can be stored to a database 140 for example, as output files 144, 146 in .xls or .xml format. Access to the model via one of the output files 144, 146 is enabled for the HMI applications at 304. Alternately, the output files 144, 146 from the model configuration module 130 are provided as input to the HMI runtime environment. At 306, the file containing the model information is parsed by the HMI application 162 during its runtime. Known techniques for parsing files of various formats can be employed at 306 to extract the model information. As discussed supra, each piece of machinery in the plant 150 is represented by a unique instance in the model. The output from the parsing process at 306 can comprise data components that uniquely identify each of the processes and assets of the plant 150 in addition to their different attributes.

At 308, the navigation schema is built to enable user browsing or monitoring of each process and each asset of the plant based on the model information that is obtained from the parsing step 306. The navigation schema enables a default order of appearance for the plant processes and assets data on a display section of the HMI application 162 based on their positions with the model hierarchy. Accordingly, if the navigation schema is generated based on a process-centric model, the initial screen can show a user a high-level view of the parent processes. Selection of one of the parent processes allows the user to drill down to its assets, sub-processes and their assets. If the navigation schema is generated based on the asset-centric model, the user can browse through the asset groups and their constituent assets. Further drilling down can enable the user to view information regarding the attributes of the assets, the processes they are associated with and their states in the processes currently being inspected by the user via the HMI screens.

The user input to the HMI application 162 during the runtime is received at 310. The user input can comprise a selection gesture that can be input via the various modalities. The selection gesture can comprise but is not limited to a mouse click, a tap, a swipe on a touchscreen, audio command or a gesture input and the like. An entity associated with the user gesture is identified at 312. If the HMI application 162 is generated from a process-centric model and the entity associated with the user gesture is a process, information regarding the process is retrieved from the model at 314. For example, information such as but not limited to the sub-processes and/or assets associated with the process and its sub-processes can be identified from the model at 314. Similarly, if the HMI application 162 is generated from an asset-centric model 144 and the entity associated with the user gesture is an asset, information regarding the asset is retrieved from the model at 314.

At 316, the HMI screen is populated with the entity information retrieved from the model. This mitigates the need for application developers to separately configure the navigation schema and each HMI screen as content for each HMI screen and the sequence of the HMI screens is provided by the model. If the entity is a process, various process details encoded in the model are displayed with their current status or values on the screen. Similarly, if the entity is an asset, the various attributes of the asset are retrieved from the model, and their current values are obtained from the PLC 110 to populate the display screen of the computing device 160 executing the HMI application 162.

At 318 it is determined if a further user gesture is received. If yes, the method returns to 312 to identify an entity associated with the further user gesture. In some embodiments, the further user gesture can be a selection gesture selecting plant hardware or process to view its information. In some embodiments, the further user gesture can be a selection gesture selecting a navigational UI element on the HMI screen. Navigational UI elements such as but not limited to a previous button and a next button can be included on the HMI screen.

When a previous button is selected, an entity that immediately precedes a currently displayed entity in the model 142 or 144 is identified at 312. Therefore, selection of a previous button by the user can allow the user to navigate to a parent process of the currently displayed process in some embodiments wherein a process-centric model 142 is employed for the navigation. If no parent process exists for the current process, the previous button can allow the user to navigate to a screen that was displayed immediately prior to a currently displayed screen in some embodiments. Selection of a previous button by the user wherein the navigation is based on the asset-centric model 144 can change the current asset information display to show information of another asset in the asset group or another asset that is upstream in a process. Similarly, selection of the next button can allow the user to navigate to other processes or assets as directed by the navigation schema which can be based on the process-centric model 142 or the asset-centric model 144. If it is determined at 318 that no further user gestures are received, the method terminates on the end block.

Figure 4:
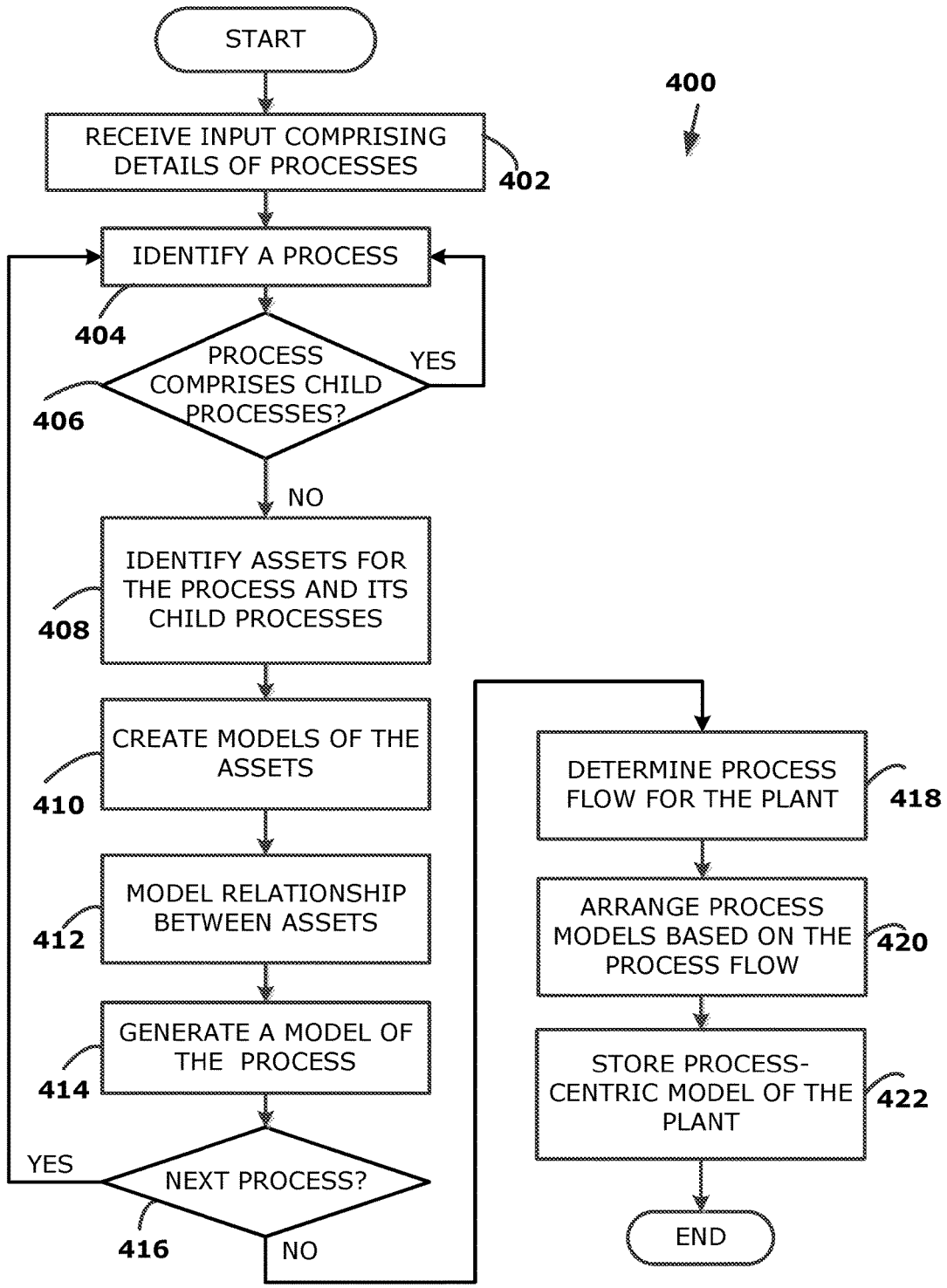
FIG. 4 is a flowchart that details generation of a process-centric model by the model configuration module in accordance with some embodiments.

FIG. 4 is a flowchart 400 that details generation of a process-centric model 142 by the model configuration module 130 in accordance with some embodiments. The method begins at 402 wherein an input comprising details of the various processes executing in the plant 150 is received. In some embodiments, the input can comprise a file with details regarding processes and assets of the control system 150. In some embodiments, the input can comprise structured data from the PLC (Programmable Logic Controller) 110 which includes signal names and sources or assets generating the signals, current values and the memory locations on the PLC 110 storing the current values of the signals. Therefore, the models can be generated from the structured data without the need for further input. In some embodiments, the input can comprise unstructured data from the PLC 110 which includes only the signal names, their current values and the PLC memory locations but does not include the information regarding the assets generating the signals. In this case, additional input regarding the assets generating the signals can be received at 402.

At 404, a process can be identified from the received input. For example, in the water treatment plant 150, one of the various processes such as but not limited to coagulation, sedimentation, filtration, quick wash and the like can be identified at 404. At 406, it is determined if the process identified at 404 can be further decomposed to identify child processes. For example, a process such as coagulation can be further decomposed to identify child processes such as chemical addition, rapid mixing and the like. If further child processes exist, the method returns to 404 to identify the next level child processes. The method cycles through the steps 404 and 406 until the no more child processes can be identified. The various assets associated with the process and its child processes are identified at 408. For example, assets such as water tanks, valves, polymer sumps, mixers, motors, pipes and flow meters used for coagulation can be identified at 408 from the received input.

The representations or models for the assets are created at 410 by the model generation module 134. A model of an asset can comprise attributes of the asset and functions that are representative of the processes carried out by the asset. In some embodiments, the attributes can be name-value pairs that are mapped to particular parameters of an asset. In some embodiments, the attributes can be variables that receive outputs of the functions. At 412, the relationship between the assets involved in the process such as parent, child, grandchild or sibling are also modeled. At 414, a model of the process is generated by the model generation module 134. In some embodiments, the process can be modeled as one or more functions that alter the states of the assets or provide values to asset attributes. In some embodiments, modeling a process can comprise generating models of sub-processes. It is determined at 416 if further processes remain for inclusion into the process-centric model 142. If further processes remain, then the method returns to 304 for selection of the next process.

If no more processes remain to be modeled, the existing processes are analyzed to determine the process flows within the plant at 418. For example, processes such as coagulation, sedimentation, filtration and the like can be occurring serially on a particular water flow in a water treatment plant. Accordingly, their process models are arranged at 420 per the determined process flow to generate a process-centric model 142 of the plant 150. A process-centric model 142 thus formed from the arrangement of the process models is stored in the memory of a computing device at 422. The analysis of the plant processes is shown serially only by the way of illustration and not limitation. It can be appreciated that information regarding the plant processes obtained at 402 can be analyzed in parallel which can speed up the generation of the process-centric models in accordance with embodiments described herein.

Figure 5:
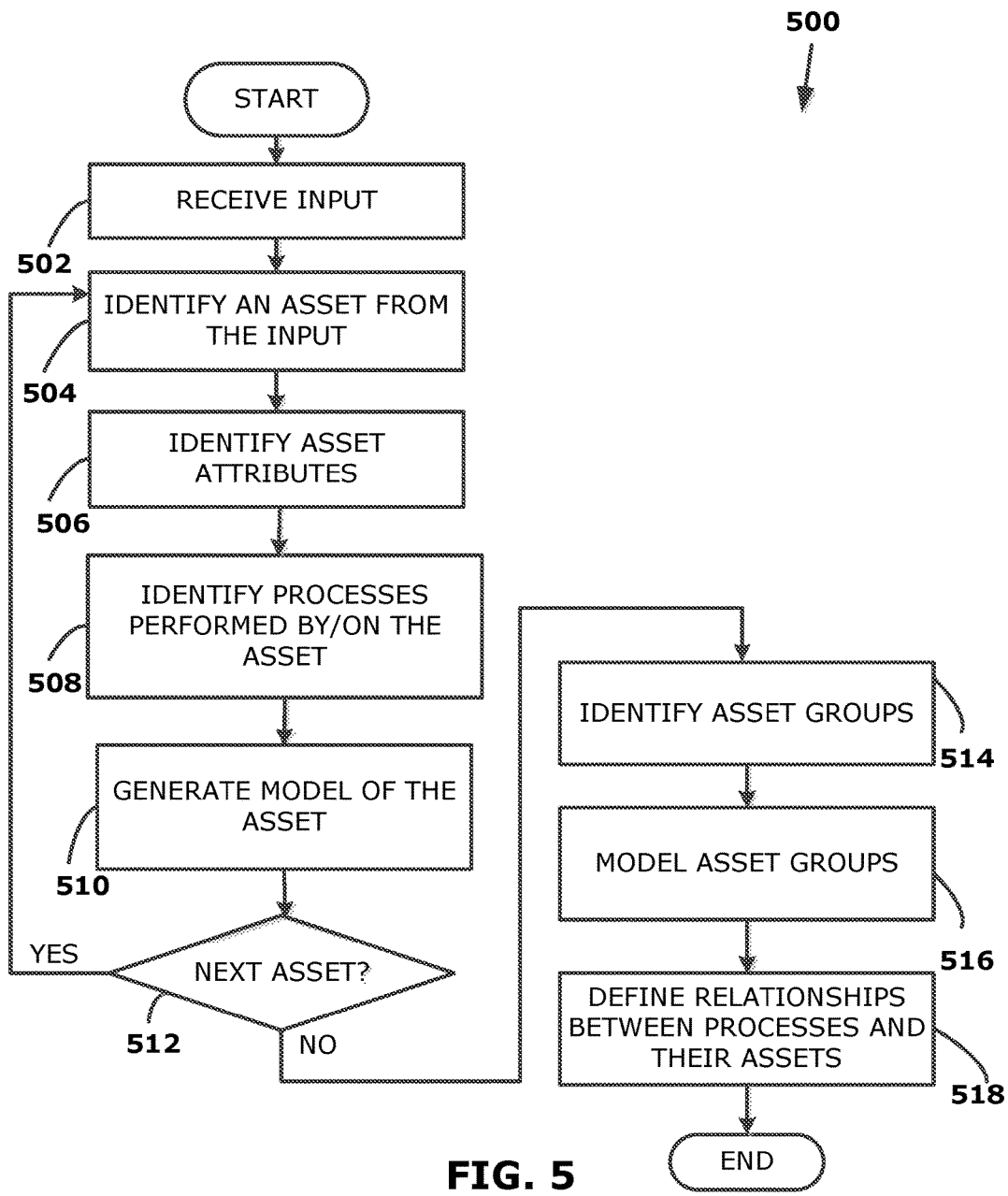
FIG. 5 is a flowchart that details a method of generating an asset-centric model by the model configuration module in accordance with embodiments described herein.

FIG. 5 is a flowchart 500 that details a method of generating an asset-centric model by the computing device 120 executing the model configuration module 130 in accordance with embodiments described herein. The method begins at 502 wherein an input comprising details of the various assets and processes executing in the plant 150 is received in a manner similar to the input received for generating the process-centric model as described above. At 504, an asset is identified from the received input. For example, an asset such as a tank, a valve, a motor or other unique representation of a real-world hardware piece of the plant is identified at 504. The attributes of the asset are identified at 506. For example, if the asset is a tank, attributes such as its total capacity, current level and the like are identified at 506. At 508, the processes executed by or executed on the asset are identified from the received input. For example, if the asset is a tank, a process such as filtration can be identified as being executed by the tank at 508.

A model of the asset is generated at 510 based on the identified attributes and processes. In some embodiments, the attributes can be modeled as variables with contextual names that receive values defining a property or state of the asset. In some embodiments, the attributes can be variables that receive or capture the result of a process executed by the asset or executed on the asset. In some embodiments, a base asset template for a particular asset such as a tank that comprises the attributes and functions for that asset can be defined. Each unique representation of a real-world asset can be derived from the base asset template wherein some or all of the attributes of the base asset template are used. The processes can be modeled as interfaces that are used to generate values or outputs as needed. In some embodiments, some of the processes from the base template may not be included in the model of the asset. At 512, it is determined if more assets remain for further modeling. If it is determined at 512 that more assets need to be modeled, the method returns to 504 to identify a next asset for modeling from the input. If it is determined at 512 that no further assets remain to be modeled, the method proceeds to 514 wherein asset groups are identified. In some embodiments, the assets that are derived from a common base template can be collectively represented as an asset group. At 518, a finalized asset-centric model of the plant 150 is generated via defining the relationships between the processes and/or asset groups associated with the processes.

Figure 6:
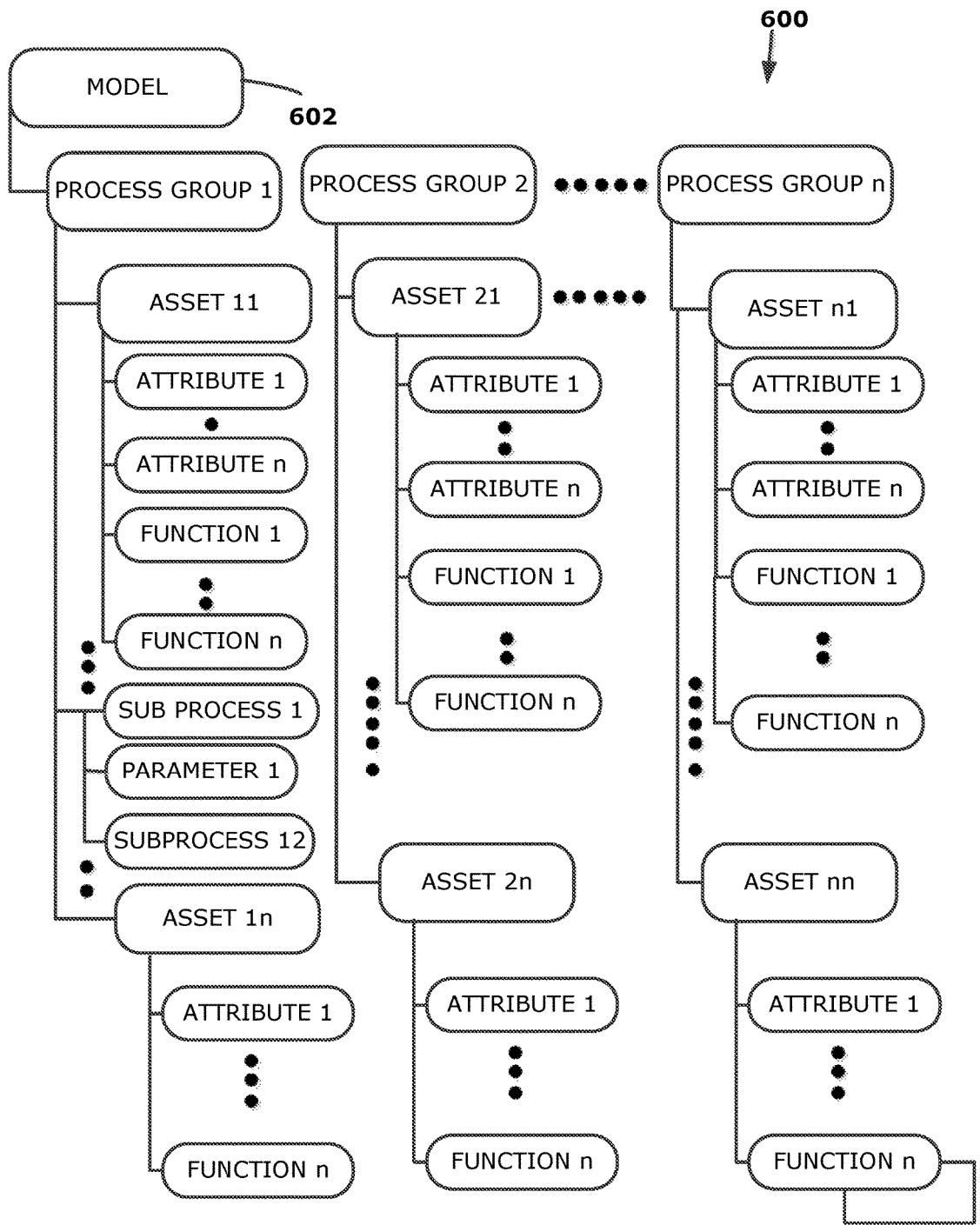
FIG. 6 is a schematic diagram of a process-centric model of a control system that is generated by the model configuration module in accordance with some embodiments described herein.

FIG. 6 is a schematic diagram 600 of a process-centric model 602 of a control system that is generated in accordance with some embodiments described herein. It can be appreciated that the model 602 is described herein only by the way of illustration and not limitation and that other models can be generated in accordance with embodiments described herein. A model 602 of a control system can comprise one or more process groups which represent collections of assets associated with each process. For example, in the model for a water treatment plant associated with the control system 150, each of the motors, pumps, tanks, valves, pipes, sensors and other machinery can be part of a process group based on the processes they are associated with. Accordingly, a plurality of asset groups Process Group 1, Process Group 2, . . . , Process Group n are defined wherein each process group represents a collection of asset models that respectively represent a piece of hardware or machinery that are associated with a process. In some embodiments, a base asset class can form a template from which instances or sub-classes of various assets of a particular type of hardware or machinery are derived.

Each process group such as process group 1 can comprise n number of different assets such as, Asset 11, Asset 12, . . . , Asset 1n that are associated with the process. Each asset can further comprise n number of different attributes, for example, Attribute 1, Attribute 2, . . . , Attribute n along with functions. In some embodiments, the attributes can comprise name-value pairs. In some embodiments, the attributes can represent output of a process executed by the asset. Each of the functions, Function 1, Function 2, . . . Function n etc., models a particular real-world procedure executed by the real-world asset. In some embodiments, a function can provide an output that can be captured and stored in an attribute. In some embodiments, functions of an asset can model interaction of the asset with other assets of the control system 150.

In addition to the asset, a process associated with the Process Group 1 can be a parent process that further comprises a Sub Process1 which further includes a Parmeter1 and another Sub Process 12. It can be appreciated that n (n being a natural number) number of process groups, n assets in each group, n number of attributes and n number of functions associated with each asset is shown only by the way of illustration and not limitation and that this number can vary depending on the nature of the asset and the real-world assets associated with the asset group. Moreover, a single asset can be associated with multiple processes. Thus, exclusive asset representations are shown under each process group in FIG. 6 only by the way of illustration. In some embodiments, an asset representation can be part of more than one process groups.

Figure 7:
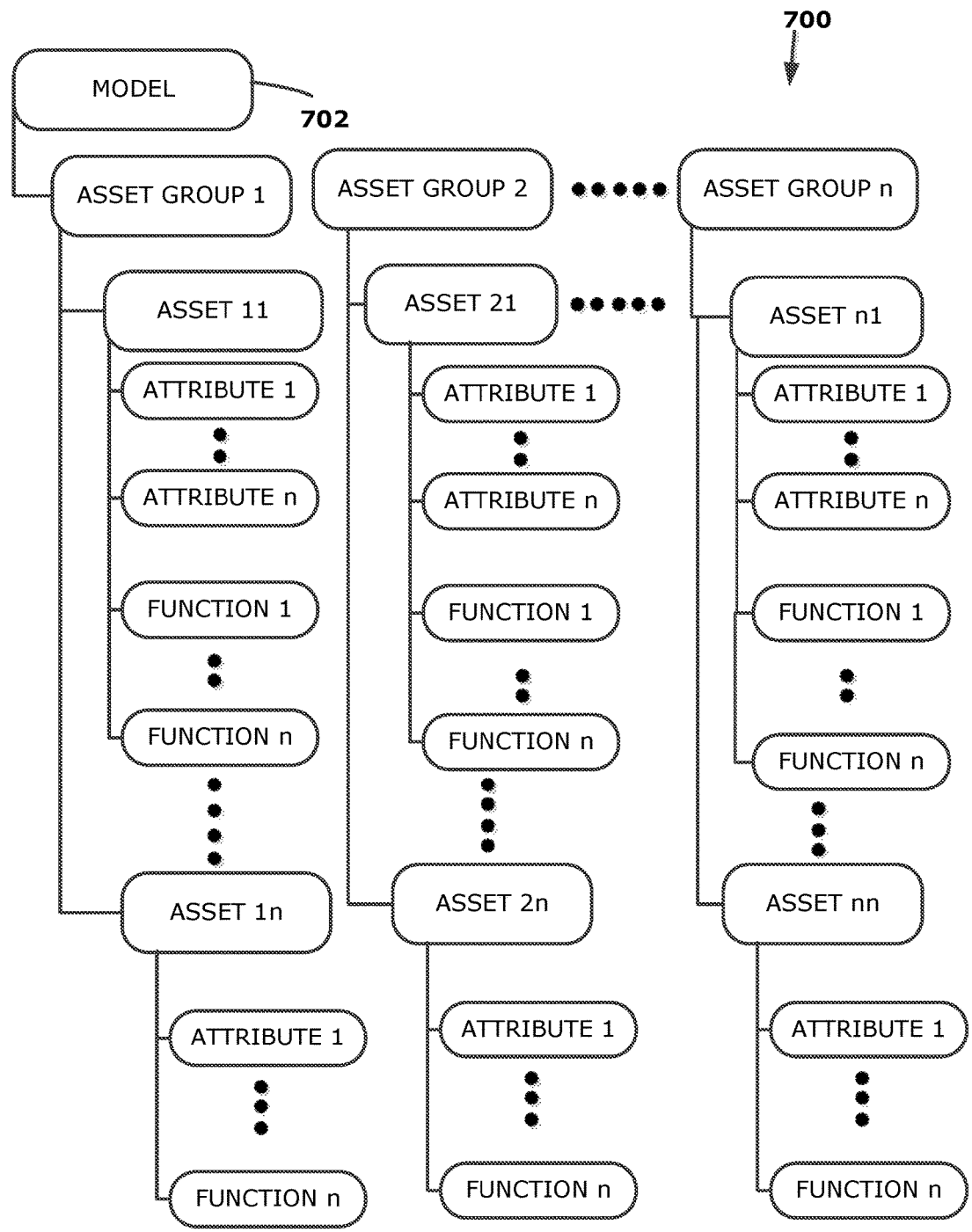
FIG. 7 is a schematic diagram of an asset-centric model of a control system that is generated by the model configuration module in accordance with some embodiments described herein.

FIG. 7 is a schematic diagram 700 of an asset-centric model 702 of a control system that is generated in accordance with some embodiments described herein. It can be appreciated that the model 702 is described herein only by the way of illustration and not limitation and that other models can be generated in accordance with embodiments described herein. A model 702 of a control system can comprise one or more asset groups. For example, in the model for a water treatment plant associated with the control system 150, each of the motors, pumps, tanks, valves, pipes, sensors and other machinery can form a respective asset group. Accordingly, a plurality of asset groups Asset Group 1, Asset Group 2, . . . , Asset Group n are defined wherein each asset group represents a collection of asset models of a particular type of hardware or machinery. In some embodiments, an asset group can be associated with a base class that forms a template from which instances or sub-classes of various assets are derived. Global asset data such as but not limited to, images of the asset to be displayed for a particular asset type can be included in the base template. Thus, each asset group such as asset group 1 can comprise n number of different assets such as, Asset 11, Asset 12, . . . , Asset 1n. Each asset can further comprise n number of different attributes, for example, Attribute 1, Attribute 2, . . . , Attribute n along with functions. In some embodiments, the attributes can comprise name-value pairs. In some embodiments, the attributes can represent output of a process executed by the asset. Each of the functions, Function 1, Function 2, . . . Function n etc., models a particular real-world procedure executed by the real-world asset. In some embodiments, a function can provide an output that can be captured and stored in an attribute. In some embodiments, functions of an asset can model interaction of the asset with other assets of the control system 150. It can be appreciated that n number of asset groups, n assets in each group, n number of attributes and n number of functions associated with each asset is shown only by the way of illustration and not limitation and that this number can vary depending on the nature of the asset and the real-world assets associated with the asset group.

Figure 8:
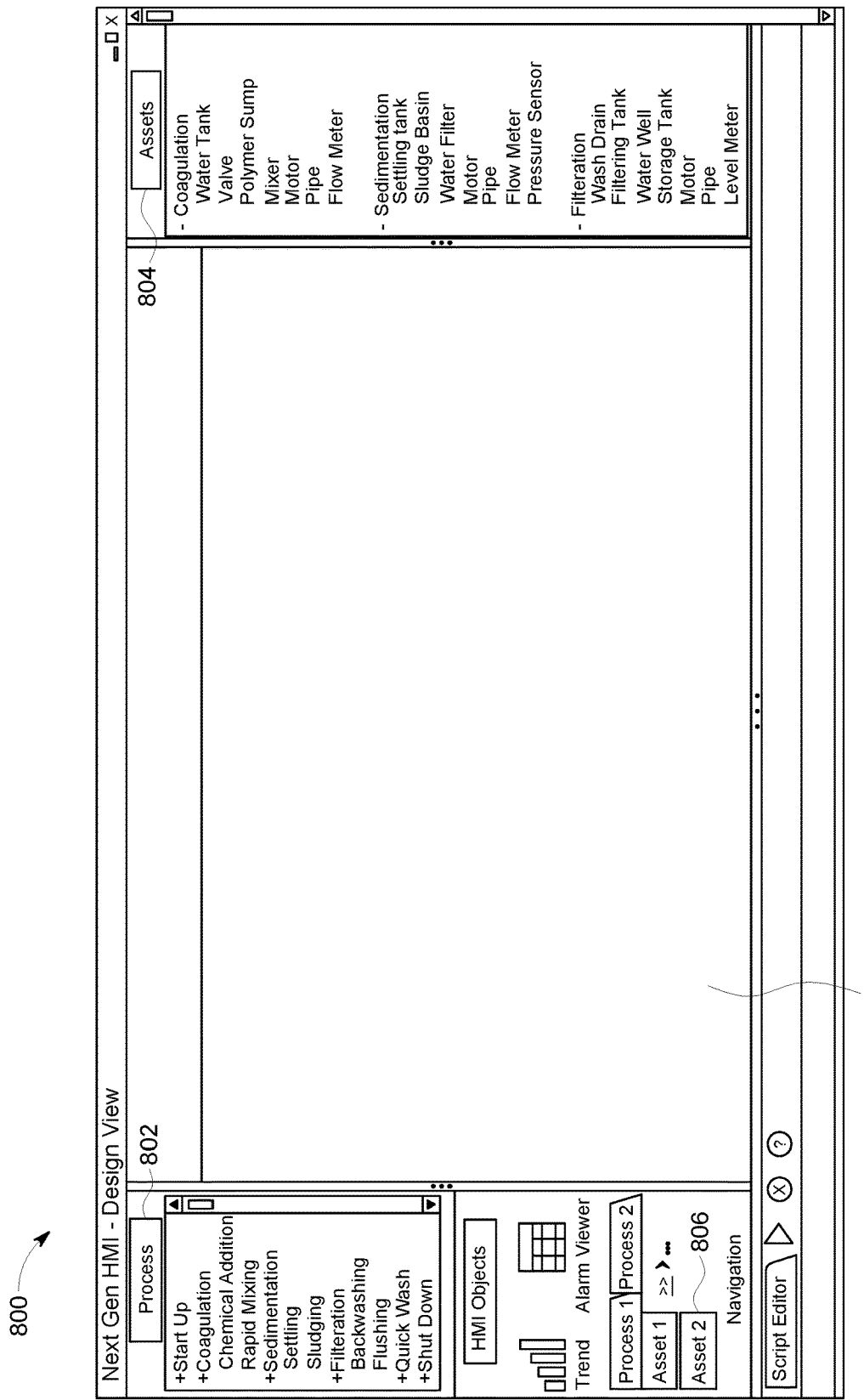
FIG. 8 is an illustration of a HMI screen generated in accordance with embodiments described herein.

FIG. 8 is an illustration of a HMI screen 800 generated in accordance with the embodiments described herein. It can be appreciated that the various HMI screens and their UI (user interface) elements are shown herein only by the way of illustration and not limitation and that other HMI screens with different UI elements can be generated in accordance with the disclosed embodiments. The HMI screen 800 comprises a listing of processes 802 executed by the water treatment plant 150. The HMI screen 800 also comprises a listing of assets 804 associated with the various processes in the water treatment plant 150. Another tabbed view 806 of the processes and assets also forms a part of the HMI screen 800. Upon selection of a process or an asset respectively from the tree structures 802 or 804 or the tabbed view 806, the details of the selected process or the selected asset are displayed in the central display area 810.

Figure 9:
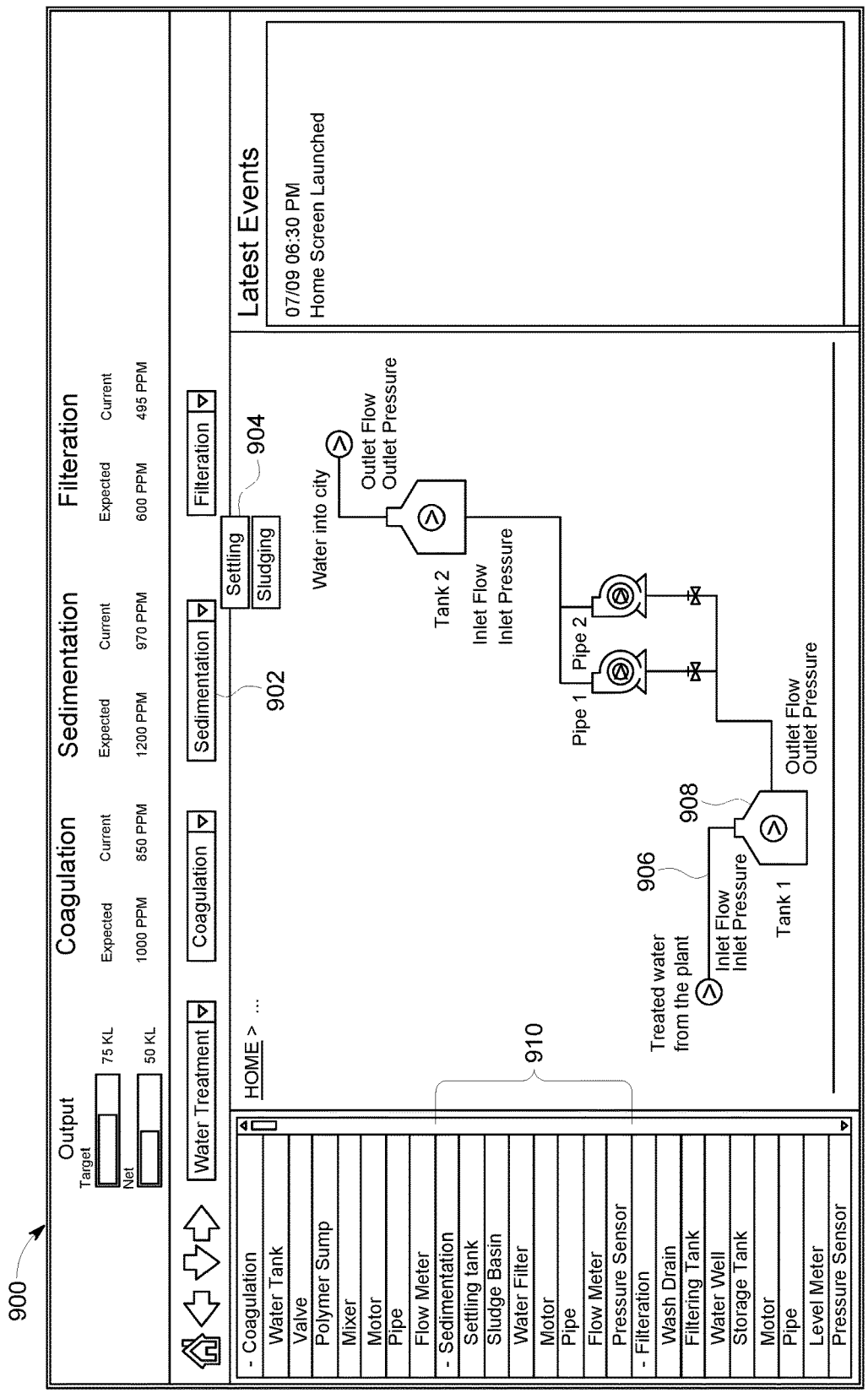
FIG. 9 is an illustration of a HMI screen that can be generated when a user selects to view information regarding the sedimentation process in accordance with some embodiments.

FIG. 9 is an illustration of a HMI screen 900 that can be generated when a user selects to view information regarding the sedimentation process 902 in accordance with some embodiments. In some embodiments, a navigation schema built based on the process-centric model 142 enables populating the HMI screen 900. The screen 900 reveals at 904 that settling and sludging are two sub-processes or child processes of the sedimentation process 902. Various assets such as a settling tank, a water filter, pipes, motor, a pressure sensor and other assets of the sedimentation process are shown at 910. Particular information regarding some specific assets such as pipes 906, tanks 908 is shown on the HMI display screen 900 in response to the user selection. The particular information is retrieved from the process-centric model 142 based on a user interface element of the HMI screen 900 which received the selection gesture and selecting an entity such as the sedimentation process 902 associated with the user interface element.

Figure 10:
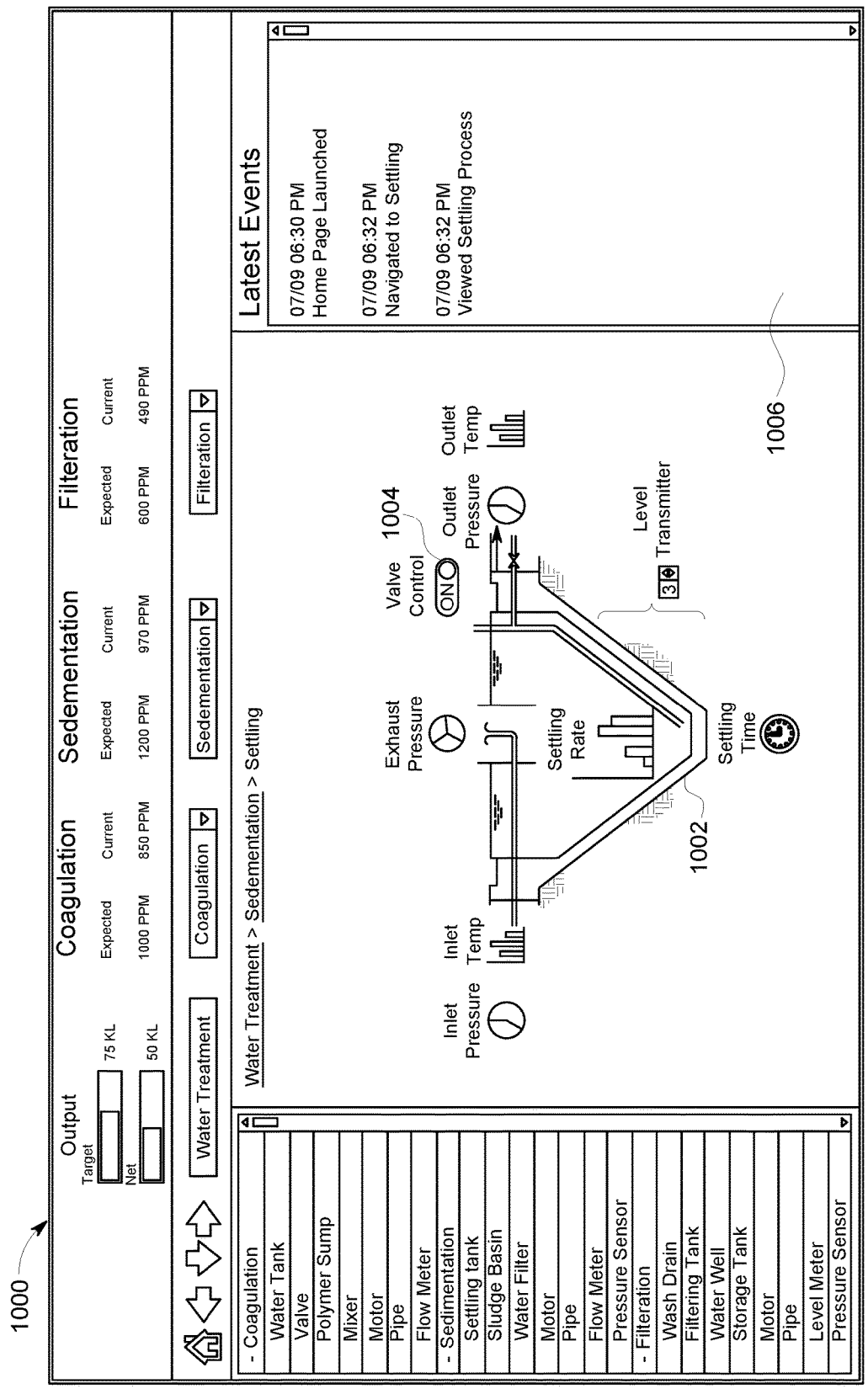
FIG. 10 is an illustration of a HMI screen that is generated when the user selects to further drill down from a prior HMI screen in accordance with some embodiments.

FIG. 10 is an illustration of a HMI screen 1000 that is generated when the user selects to further drill down from the HMI screen 900 to view details regarding a tank asset 1002 of the settling sub-process. Parameters such as inlet pressure, exhaust pressure, outlet pressure, level which are output by the various assets of the settling process are shown. While the information regarding the assets and the parameters of the settling process is retrieved from the process-centric model 142, the values of the parameters are obtained from the PLC 110. In addition, the state of the valve during the settling process is shown at 1004. A log 1006 of the user activity is also included on the HMI screen 1000.

Figure 11:
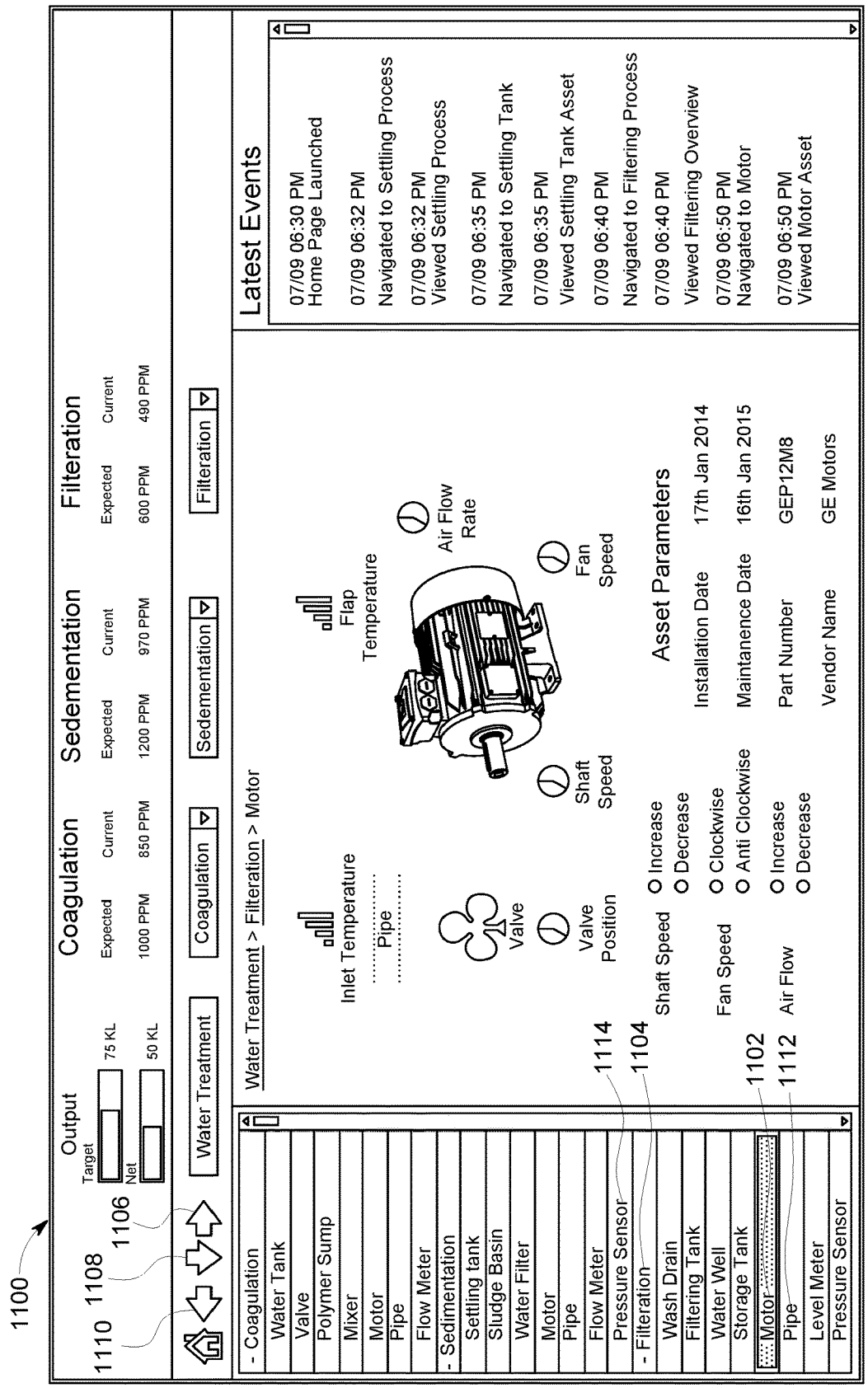
FIG. 11 is an illustration showing an example screen that is generated for an asset in accordance with some embodiments.

FIG. 11 is an illustration showing an example screen 1100 that is generated for an asset in accordance with some embodiments. A motor asset 1102 is selected from the filtration process at 1104. The various asset attributes or parameters are shown in the central display area 1104. Again, the information regarding the asset attributes to display for the filtration process can be obtained from the models 142 or 144 while the live values obtained from the PLC 110 displayed and dynamically updated. The navigation between the assets and processes is not only facilitated by the tree-view controls showing the hierarchical relationships but also by the screen navigation buttons 1106, 1108 and 1110 that are provided by the computing device executing the HMI application 162.

The 'next' button 1106 can be linked to an entity in the tree-view control that is next to the currently displayed entity. In some embodiments, the entity in the tree-view control that is next to the currently displayed entity can be an asset that immediately succeeds a currently displayed asset in the hierarchy of the process-centric model 142. The user selection of the next button 1106 can therefore transfer the display to details regarding the Pipe asset 1112 from the currently displayed motor asset. In some embodiments, the entity in the tree-view control that is next to the currently displayed entity can be a child entity of the currently displayed entities. If the currently displayed entity has no child entities defined in the model, the next button 1106 can be configured to display a sibling entity that is adjacent to the currently displayed entity.

Similarly, selection of the 'previous' button 1110 can be configured to display information regarding an entity that is placed immediately above the currently displayed entity in tree-view hierarchy. An entity above the currently displayed entity in the tree-view hierarchy can be an asset that immediately precedes a currently displayed asset in the hierarchy of the process-centric model 142. In this case, selection of the previous button 1110 can display information regarding the pressure sensor 1114. Similarly, selection of the 'down' button 1108 can take the user to the next node in the tree-view control, which is a process (not shown) located below the sedimentation process on the screen 1100. In some embodiments, selection of the 'previous' button 1110 can be configured to display a view that was previous shown in some embodiments.

In accordance with the disclosed embodiments, data regarding the processes, assets, asset groups, parameters and relationships is defined once during the model configuration stage. The data is reused at HMI runtime to automatically generate the navigation per the model structure. Thus, any changes to the control system 150 can be incorporated into the models 142 or 144 in order to be automatically exported to upstream applications such as the HMI application 162. This minimizes the reconfiguring that is needed when changes occur in the control system logic thereby minimizing errors.

Figure 12:
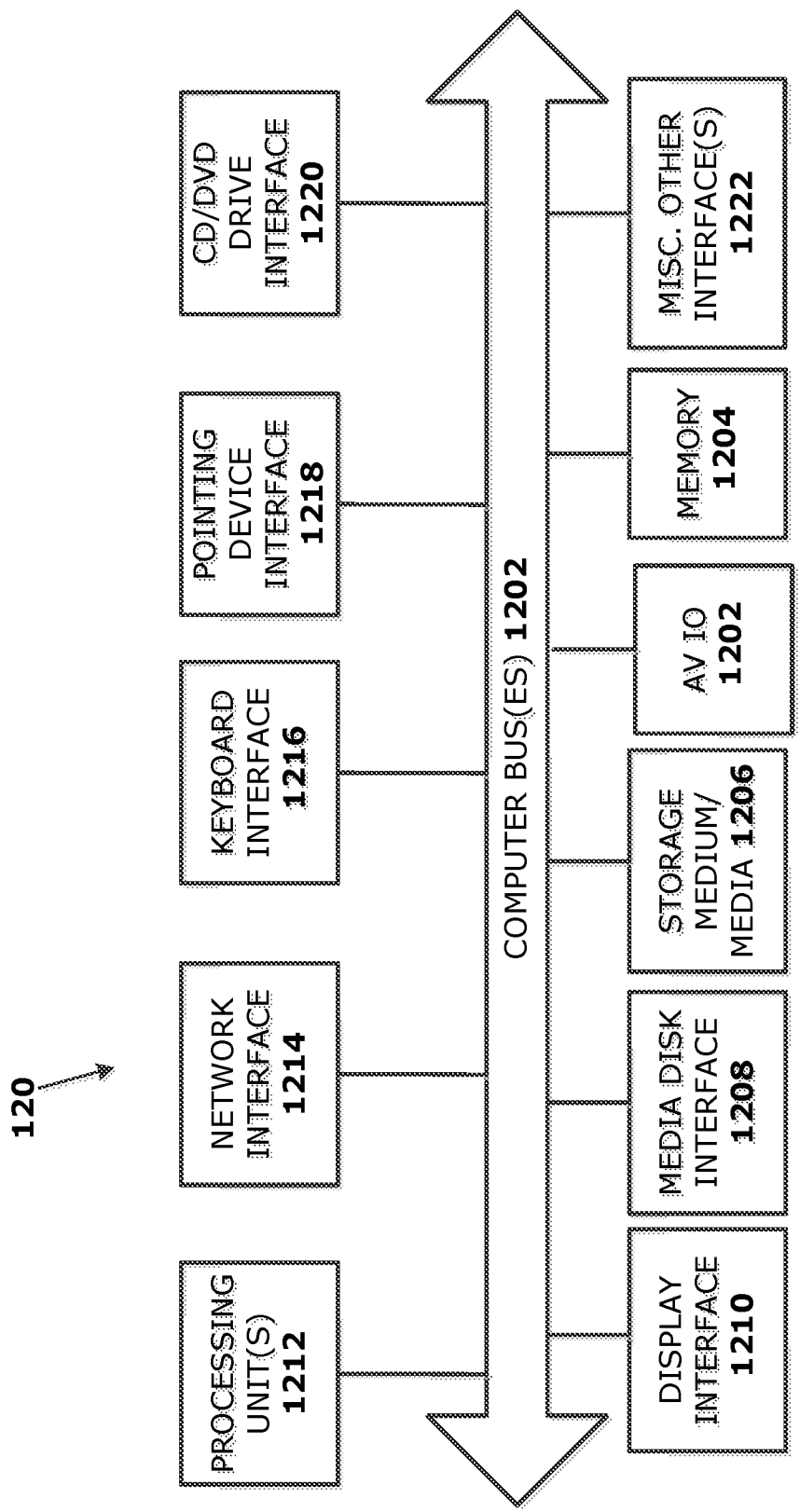
FIG. 12 illustrates the internal architecture of a computing device in accordance with embodiments described herein.

FIG. 12 illustrates the internal architecture of a computing device 120 or a computing device 160 in accordance with embodiments described herein. It may be appreciated that the internal architecture of the computing device 120 is only provided for better describing the subject matter and that any other computing device currently existing or to be invented can be used to generate or employ a model configuration module 130 or a HMI application 162 described herein. The computing device 120 includes one or more processing units (also referred to herein as CPUs) 1212, which interface with at least one computer bus 1202. Also interfacing with computer bus 1202 are AV IO interfaces 1202 such as a camera, microphone, speakers and the like which receive and provide audio/video data, persistent storage medium/media 1206, network interface 1214, memory 1204, e.g., random access memory (RAM), run-time transient memory, read only memory (ROM), etc., media disk drive interface 1208, an interface 1220 for a drive that can read and/or write to media including removable media such as floppy, CD-ROM, DVD, etc., media, display interface 1210 as interface for a monitor or other display device, keyboard interface 1216 as interface for a keyboard, pointing device interface 1218 as an interface for a mouse or other pointing device, and miscellaneous other interfaces 1222 not shown individually, such as parallel and serial port interfaces, a universal serial bus (USB) interface, and the like.

Memory 1204 interfaces with computer bus 1202 so as to provide information stored in memory 1204 to CPU 1212 during execution of software programs such as an operating system, application programs such as the model configuration module 130, device drivers, and software modules that comprise program code or logic, and/or computer-executable process steps, incorporating functionality described herein, e.g., one or more of process flows described herein. CPU 1212 first loads computer-executable process steps or logic from storage, e.g., memory 1204, storage medium/media 1206, removable media drive, and/or other storage device. CPU 1212 can then execute the stored process steps/logic of the loaded computer-executable process. Stored data, e.g., data stored by a storage device, can be accessed by CPU 1212 during the execution of computer-executable process steps.

Persistent storage medium/media 1206 is a computer readable storage medium(s) that can be used to store software and data, e.g., an operating system and one or more application programs. Persistent storage medium/media 1206 can also be used to store device drivers, such as one or more of a digital camera driver, monitor driver, printer driver, scanner driver, or other device drivers, web pages, content files, metadata, playlists and other files. Persistent storage medium/media 1206 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise non-transitory computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, program logic, processor-executable instructions, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method, comprising:
accessing, by at least one computing device, a file comprising information regarding a model of a control system, the control system comprising one or more processes and one or more assets and the model information comprising unique representations for each of the processes and assets;
parsing, by the at least one computing device, the file comprising the model information;
identifying, by the computing device, the processes, assets and relationships between the processes and assets;
building, by the computing device, a navigation schema for a Human Machine Interface application based on the model, the navigation schema provides an order of appearance for the model information on a display of the Human Machine Interface application; and
receiving, by the computing device, a selection gesture that selects a user interface element on the display of the Human Machine Interface application;
determining, by the computing device, an entity associated with the user interface element;
retrieving, by the computing device, information regarding the entity from the file; and
populating, by the computing device, a screen on the display of the Human Machine Interface application with the retrieved information regarding the entity.

2. The method of claim 1, the model being a process-centric model comprising representations of the processes and the assets associated with the processes.

3. The method of claim 1, the model being an asset-centric model comprising asset groups wherein each asset group comprises a collection of asset representations grouped together based on a type of hardware.

4. The method of claim 1, further comprising:
providing, by the computing device, at least a previous and a next navigational user interface elements on the screen of the Human Machine Interface application.

5. The method of claim 4, further comprising:
displaying, by the computing device, information regarding an entity that immediately precedes a currently displayed entity in hierarchy of the model when the previous navigational user interface element is selected by the selection gesture.

6. The method of claim 4, further comprising:
displaying, by the computing device, information regarding an entity that immediately succeeds a currently displayed entity in hierarchy of the model when the next navigational user interface element is selected by the selection gesture.

7. The method of claim 1, further comprising:
receiving, by the computing device, information regarding the one or more processes and the one or more assets of the control system;
generating, by the computing device, the model of the control system from the received information, the model being one of a process-centric model or an asset-centric model.

8. The method of claim 7, the process-centric model comprising representations of the processes and the assets associated with the processes.

9. The method of claim 7, the asset-centric model comprising asset groups wherein each asset group comprises a collection of asset representations grouped together based on a type of represented hardware.

10. The method of claim 1, providing access to the model to the Human Machine Interface application further comprises:
generating, by the computing device, the file comprising information from the model; and
storing, by the computing device, the file in a database accessible to the Human Machine Interface application.

11. The method of claim 1, the process-centric model comprising representations of the processes and the assets associated with the processes.

12. The method of claim 1, the asset-centric model comprising asset groups wherein each asset group comprises a collection of asset representations grouped together based on a type of represented hardware.

13. The method of claim 1, receiving information regarding one or more processes and one or more assets further comprises:
receiving, by the computing device, an input file comprising the information regarding the control system.

14. A computing device comprising:
a processor;
a storage medium for tangibly storing thereon program logic executable by the processor, the program logic comprising instructions for:
accessing, by the computing device, a file comprising information regarding a model of a control system, the control system comprising one or more processes and one or more assets and the model information comprising unique representations for each of the processes and assets;
parsing, by the computing device, the file comprising the model information;
identifying, by the computing device, the processes, assets and relationships between the processes and assets;
building, by the computing device, a navigation schema for a Human Machine Interface application based on the model, the navigation schema provides an order of appearance for the model information on a display of the Human Machine Interface application; and
receiving, by the computing device, a selection gesture that selects a user interface element on the display of the Human Machine Interface application;
determining, by the computing device, an entity associated with the user interface element;
retrieving, by the computing device, information regarding the entity from the file;
populating, by the computing device, a screen on the display of the Human Machine Interface application with the retrieved information regarding the entity.

15. The computing device of claim 14, the model being a process-centric model comprising representations of the processes and the assets associated with the processes.

16. The computing device of claim 14, the model being an asset-centric model comprising asset groups wherein each asset group comprises a collection of asset representations grouped together based on a type of represented hardware.

17. The computing device of claim 14, the display of the Human Machine Interface application further comprising at least a previous and a next navigational user interface elements on the screen.

18. The computing device of claim 14, program logic further comprising instructions for:

displaying, by the computing device, information regarding an entity that immediately precedes a currently displayed entity in hierarchy of the model when the previous navigational user interface element is selected by the selection gesture, and,
displaying, by the computing device, information regarding an entity that immediately succeeds a currently displayed entity in hierarchy of the model when the next navigational user interface element is selected by the selection gesture.

19. A non-transitory computer-readable storage medium, comprising processor-executable instructions for:
accessing a file comprising information regarding a model of a control system, the control system comprising one or more processes and one or more assets and the model information comprising unique representations for each of the processes and assets;
parsing, the file comprising the model information;
identifying, the processes, assets and relationships between the processes and assets;
building, a navigation schema for a Human Machine Interface application based on the model, the navigation schema provides an order of appearance for the model information on a display of the Human Machine Interface application; and
receiving, a selection gesture that selects a user interface element on the display of the HMI application;
determining an entity associated with the user interface element;
retrieving information regarding the entity from the file;
populating a screen on the display of the Human Machine Interface application with the retrieved information regarding the entity.

20. A method, comprising:
receiving, by at least one computing device, information regarding one or more processes and one or more assets of a control system;
generating, by the computing device, a model of the control system from the received information, the model being one of a process-centric model or an asset-centric model;
providing, by the computing device, access to the model during runtime of a Human Machine Interface application; and
enabling, by the computing device, generation of navigation schema for the Human Machine Interface application based on the model, wherein for the process-centric model, a navigation schema based on processes of the control system is generated and for the asset-centric model, a navigation schema based on assets of the control system is generated.

21. The method of claim 20, providing access to the model to the Human Machine Interface application further comprises:
generating, by the computing device, an output file comprising information from the model; and
storing, by the computing device, the output file in a database accessible to the Human Machine Interface application.

22. A computing device comprising:
a processor;
a storage medium for tangibly storing thereon program logic executable by the processor, the program logic comprising:
receiving logic that receives information regarding one or more processes and one or more assets of a control system;

generating logic that generates a model of the control system from the received information, the model being one of a process-centric model or an asset-centric model;

storing logic that provides access to the model during runtime of a Human Machine Interface application; and logic for enabling generation of navigation schema for the Human Machine Interface application based on the model, wherein for the process-centric model, a navigation schema based on processes of the control system is generated and for the asset-centric model, a navigation schema based on assets of the control system is generated.

23. The computing device of claim 22, the process-centric model comprising representations of the processes and the assets associated with the processes.

24. The computing device of claim 22, the asset-centric model comprising asset groups wherein each asset group comprises a collection of asset representations grouped together based on a type of represented hardware.

25. A non-transitory computer-readable storage medium, comprising processor-executable instructions for:

receiving information regarding one or more processes and one or more assets of a control system;

generating a model of the control system from the received information, the model being one of a process-centric model or an asset-centric model;

providing access to the model during runtime of a Human Machine Interface application; and enabling generation of navigation schema for the Human Machine Interface application based on the model, wherein for the process-centric model a navigation schema based on processes of the control system is generated and for the asset-centric model user a navigation schema based on assets of the control system is generated.

* * * * *